United States Patent
Williams et al.

(10) Patent No.: US 6,752,358 B1
(45) Date of Patent: Jun. 22, 2004

(54) LAMINAR FLOW CONTROL SYSTEM AND SUCTION PANEL FOR USE THEREWITH

(75) Inventors: Stewart W Williams, Bristol (GB); Brian J Turner, Bristol (GB)

(73) Assignee: Bae Systems plc, Farnborough (GB)

( * ) Notice: Subject to any disclaimer, the term of this patent is extended or adjusted under 35 U.S.C. 154(b) by 390 days.

(21) Appl. No.: 09/601,884

(22) PCT Filed: Jun. 7, 2000

(86) PCT No.: PCT/GB00/02210

§ 371 (c)(1),
(2), (4) Date: Aug. 9, 2000

(87) PCT Pub. No.: WO01/00488

PCT Pub. Date: Jan. 4, 2001

(51) Int. Cl.$^7$ ............................................. B64C 21/06
(52) U.S. Cl. ....................................................... 244/208
(58) Field of Search ................................ 244/208, 209, 244/130, 204

(56) References Cited

U.S. PATENT DOCUMENTS

| | | | |
|---|---|---|---|
| 2,742,247 A | * | 4/1956 | Lachmann |
| 2,833,492 A | * | 5/1958 | Fowler |
| 3,128,973 A | * | 4/1964 | Dannenberg |
| 3,521,837 A | * | 7/1970 | Papst |
| 4,664,345 A | * | 5/1987 | Lurz |
| 4,749,150 A | * | 6/1988 | Rose et al. |
| 5,263,667 A | * | 11/1993 | Horstman |
| 5,316,032 A | | 5/1994 | DeCoux |
| 5,366,177 A | * | 11/1994 | DeCoux |
| 5,368,258 A | * | 11/1994 | Johnson et al. |
| 5,591,511 A | * | 1/1997 | Yasui |
| 5,618,363 A | * | 4/1997 | Mullender et al. |
| 5,741,456 A | | 4/1998 | Ayrton |
| 5,772,156 A | | 6/1998 | Parikh et al. |
| 5,806,796 A | * | 9/1998 | Healey |
| 6,050,523 A | * | 4/2000 | Kraenzien |
| 6,068,328 A | * | 5/2000 | Gazdzinski |

FOREIGN PATENT DOCUMENTS

| | | |
|---|---|---|
| EP | 0536874 A1 | 4/1993 |
| EP | 0 845 410 | 6/1998 |
| GB | 0713426 A | 8/1954 |
| GB | 1164353 A | 9/1969 |
| GB | 2256253 A | 12/1992 |
| GB | 2294709 A | 5/1996 |
| GB | 2296306 A | 6/1996 |
| JP | 050310193 A | 11/1993 |
| WO | 94 15746 A | 7/1994 |

OTHER PUBLICATIONS

T. Keizo, *Patent Abstracts of Japan*, vol. 18, No. 119, (M–1567), Feb. 1994.

"Reducing aircraft drag by drilling holes in wings" *Design Engineering*, p. 14, Mar. 1995.

D.V. Maddalon, "Making Large Suction Panels for Laminar–Flow Control" *NTIS Tech Notes*, p. 396, May 1991.

* cited by examiner

*Primary Examiner*—Tien Dinh
(74) *Attorney, Agent, or Firm*—Nixon & Vanderhye P.C.

(57) ABSTRACT

A laminar flow control system for incorporation in, for example, an aircraft flying surface includes a suction panel comprising a perforated skin (20, 40) mounted on a base member (60), a plenum chamber (30) being in communication with a plurality of micro channels (90) formed in the top surface of the base member (60), the micro channels (90) being in communication with the holes (40) in the skin (20).

15 Claims, 4 Drawing Sheets

US 6,752,358 B1

LAMINAR FLOW CONTROL SYSTEM AND SUCTION PANEL FOR USE THEREWITH

This application is the U.S. national phase of International Application No. PCT/GB00/02210, filed 7 Jun. 2000, which designated the U.S., the entire content of which si hereby incorporated by reference.

BACKGROUND OF THE INVENTION

1. Field of the Invention

The present invention relates to a laminar flow control system (LFC) and to a suction panel for use therewith, although such a suction panel could have other uses.

2. Discussion of Prior Art

The specific application of the present invention is in a laminar flow control system (LFC) which could be incorporated into an aircraft wing or other aerodynamic surface where it is desired to control the flow of air over the surface.

There are known LFC systems which comprise a panel 1, in the form of a perforated skin 2, typically made of titanium and mounted on large scale plenum chambers 3a, 3b etc. This is illustrated in FIG. 1. The air flow is on the top surface of the system above the panel 1 as indicated by the arrow Z in FIG. 1. To maintain boundary layer control suction is applied through the perforated skin 2 through a series of large scale plenum chambers 3a, 3b . . . as illustrated. The plenum chambers 3a, 3b . . . are connected together by pipework and suction is applied as indicated by arrow Y in FIG. 1. In general, there will be a pressure gradient along the top surface due to the flow of the air. In FIG. 1 for example at the positions of the holes shown the pressures could be $P_1 > P_2 > P_3 \ldots > P_x$ (or reverse). It is necessary to make sure that no flow occurs through holes 4 in the skin 2 and in the plenum chambers 3a, 3b . . . to cause this pressure gradient to equalise (a condition known as outflow). To avoid this the pressure drop $\Delta P_p$ across the perforated skin 2 needs to be greater than $P_x - P_1$. $\Delta P_p$ is limited by the maximum pitch and the size of the holes 4 that can be drilled. The pitch is limited by the requirement to have effectively uniform suction and the hole size is limited by the drilling process. In addition, there is a requirement that the suction velocity in a particular hole 4 does not exceed a critical value that would disturb the flow.

These operational and mechanical integrity restrictions mean that there is a maximum size for the dimension D of each plenum chamber 3a, 3b . . . . Hence in general for LFC applications there are large numbers of these plenum chambers 3a, 3b . . . . This introduces some serious problems.

For example the pressure of the plenum chambers reduces the overall stiffness of the suction panel. This leads to the need for a thicker, heavier weight stain to improve the stiffness but at the expense of undescribably increasing the weight of the panel.

In areas where a wall 5 of the plenum chamber 3a, 3b . . . is attached to the perforated skin 2 there is no suction. These areas are relatively large in order to provide the necessary mechanical integrity to the structure. This will destabilise the flow and in the worst case could cause a transition to turbulent flow. The problem would get worse with larger plenum chambers as bigger skin support landings would be required. Therefore a significant fraction of the surface contains regions with no suction. In the panel shown in FIG. 1 the perforated skin 2 is typically 1–2 mm thick and the overall depth or thickness of the panel as a whole, i.e. dimension E, is 2–3 cms. Overlap of the holes 4 by wall 5, typically of the order of 3 to 5 mm causes loss of suction. D typically is 3 to 5 cms.

SUMMARY OF THE INVENTION

According to one aspect of the present invention there is provided a laminar flow control system which comprises a perforated skin, a plurality of plenum chambers on which the skin is mounted, means for applying suction to the plenum chambers in order to maintain boundary layer suction to a free surface of the perforated skin and micro-channels formed either in the mounted side of the skin or in a support which carries the skin.

According to another aspect of the present invention, there is provided a suction panel for use in a laminar flow control system including a perforated skin, a plurality of plenum chambers on which the skin is mounted and micro-channels formed either in the mounted side of the skin or in a support for the skin.

According to a further aspect of the present invention, there is provided a method of manufacturing a suction panel as specified in the immediately preceding paragraphs including the step of employing a laser beam to form the micro-channels and the perforations in the skin.

According to yet another aspect of the present invention there is provided, an aircraft flying surface incorporating a laminar flow control system as specified in three paragraphs above.

BRIEF DESCRIPTION OF THE DRAWINGS

How the invention may be carried out will now be described by way of example only and with reference to the accompanying drawings in which.

DETAILED DISCUSSION OF PREFERRED EMBODIMENTS

FIG. 1

Figure 1:
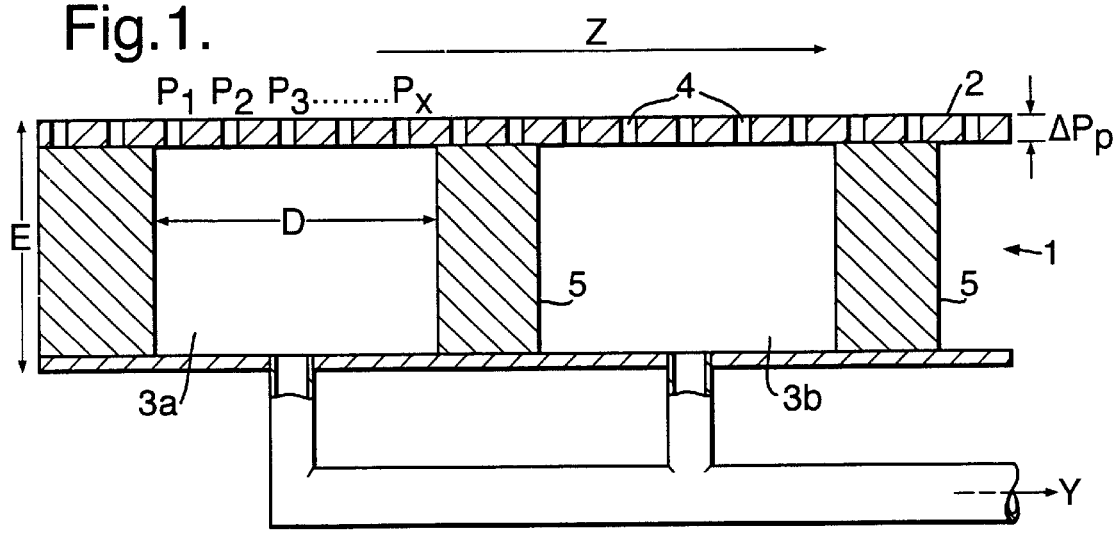
FIG. 1 is a sectional view of a known laminar flow control system.
Figure 2:
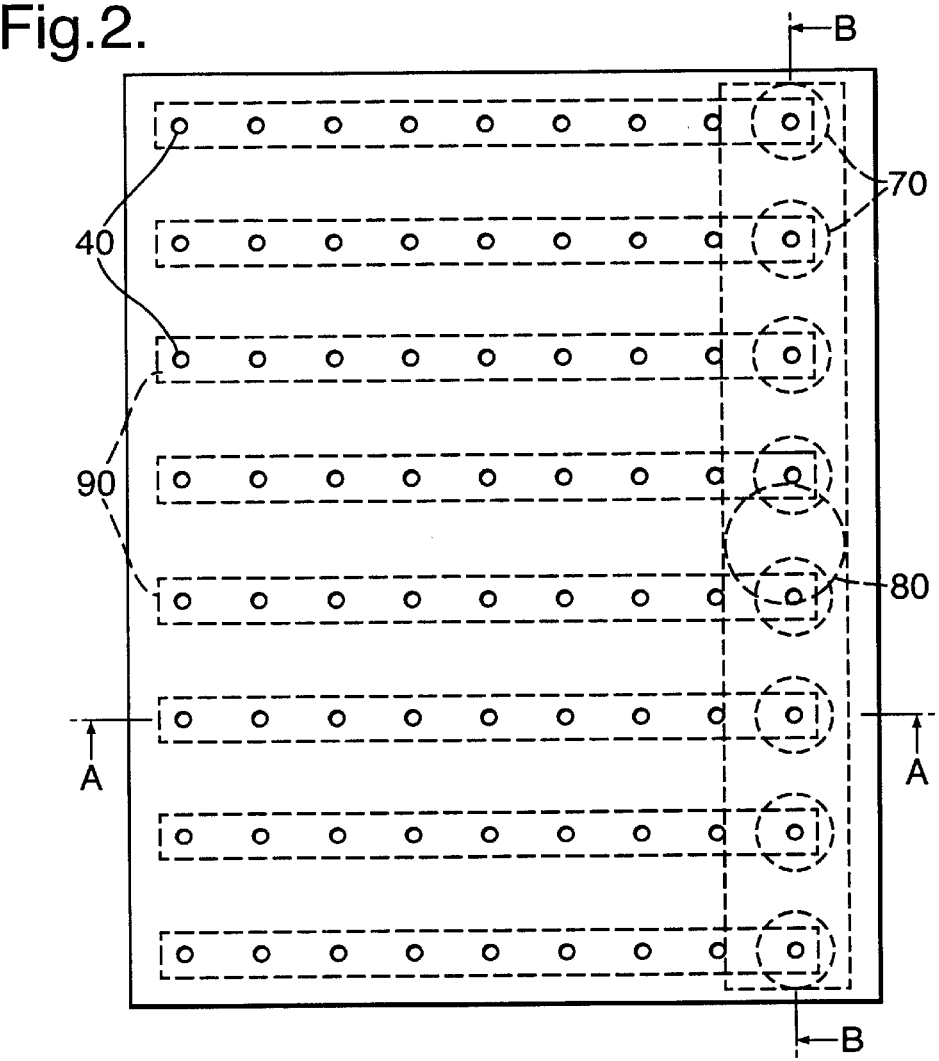
FIG. 2 is a plan view of a suction panel constructed according to the present invention and for use in a laminar flow control system.

A known prior art arrangement is illustrated in FIG. 1 and has already been described.

FIGS. 2–6

In an embodiment of the present invention a suction panel 10, for an LFC system, comprises a perforated skin 20 having holes 40, which skin is supported on a base member 60 which in this embodiment comprises a first layers 60 and a second base layer 60b each of a carbon fibre composite (CFC).

Figure 4:
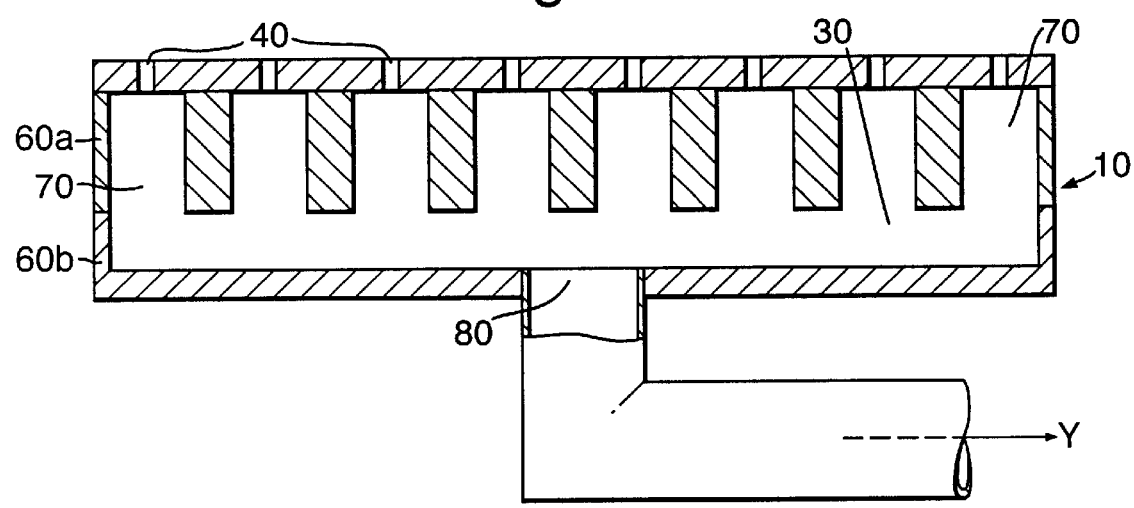
FIG. 4 is a section taken on the line B—B of FIG. 2.

The first or upper CFC base layer 60a supports the skin 20, as indicated in FIG. 4, and has formed in it suction holes 70, the second or bottom CFC base layer 60b supporting the upper CFC base layer 60a and having formed therein a plenum chamber 30 to which suction Y can be applied via a main suction hole 80.

The CFC base layers 60a and 60b are glued to one another and the perforated skin 20 is also glued to the upper CFC base layer 60a.

Figure 3:
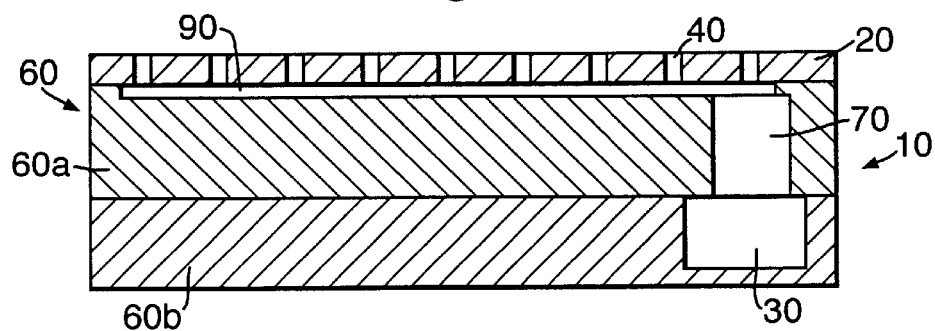
FIG. 3 is a section taken on the line A—A of FIG. 2.

Typically, the perforated skin 20 will be made of titanium and will be drilled with micro holes of about 50 microns diameter on a 10:1 pitch diameter ratio. For clarity, in the embodiment shown there are only eight rows of nine holes but in an actual system the number of holes may be much higher. Each of the micro holes 40 in a row communicates with the same micro channel 90, as shown in FIG. 3, each micro channel communicating at one end with a suction hole 70 which is formed in the first or upper CFC base layer 60a.

The width of each micro channel 90 is preferably be in the range of one to four times the diameter of the holes 40.

The pressure gradient requirements for flow within the micro channels 90 would be obtained by the width of the micro channels, together with their depth.

At the end of the micro channels 90 a relatively large hole 70 is drilled through the upper CFC base layer 60a to allow suction to be applied to the micro channels. The plenum chamber 30 in the lower CFC base layer 60b is in communication with each of the suction holes 70.

It was mentioned earlier that the base layers 60a and 60b are glued together and that the aperture skin 20 is glued to the upper base layer 60a.

In order to locate such glueing secondary micro channels could be micro-machined between the suction micro channels 90 but these secondary micro channels are not illustrated in the drawings.

Figure 5:
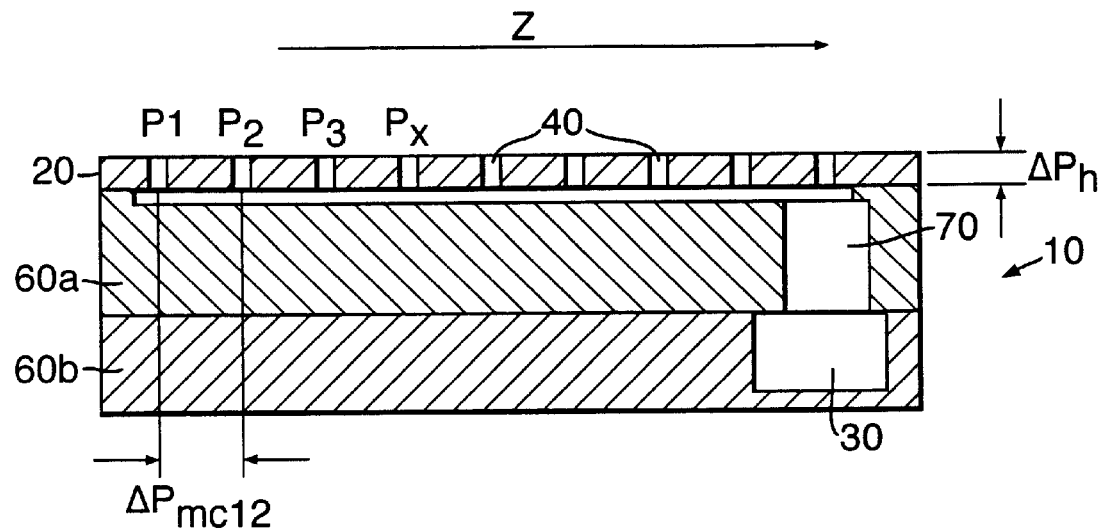
FIG. 5 is a section substantially the same as FIG. 3 but illustrates pressures at individual apertures in the perforated skin.

As indicated earlier, the detailed design of the micro channels 90 is determined by the pressure gradient requirements of the particular application. In order to illustrate this, reference is made to FIGS. 5 and 6, FIG. 5 being similar to FIG. 3 in terms of the structure and FIG. 6 being a graph plotting pressure P against position X for the top surface of the perforated skin 20, with the line $L_1$ showing the pressure profile on the outer surface of the skin, and line $L_2$ showing the idealised pressure profile in the machined microchannel 90.

In general there will be some pressure gradient in the direction of the flow A and, in this case, the pressure will be higher on the left-hand side from the right-hand side but the reverse could apply. In this example $P_1 > P_2 > P_3 \ldots > P_x$.

If a simple large scale plenum chamber 3 is used, then the pressure drop across the perforated skin 20 $\Delta P_p$ needs to be greater than $P_1 - P_x$. Clearly, the larger the number of holes 70 contained in the plenum chamber, the larger $\Delta P_p$.

Figure 6:
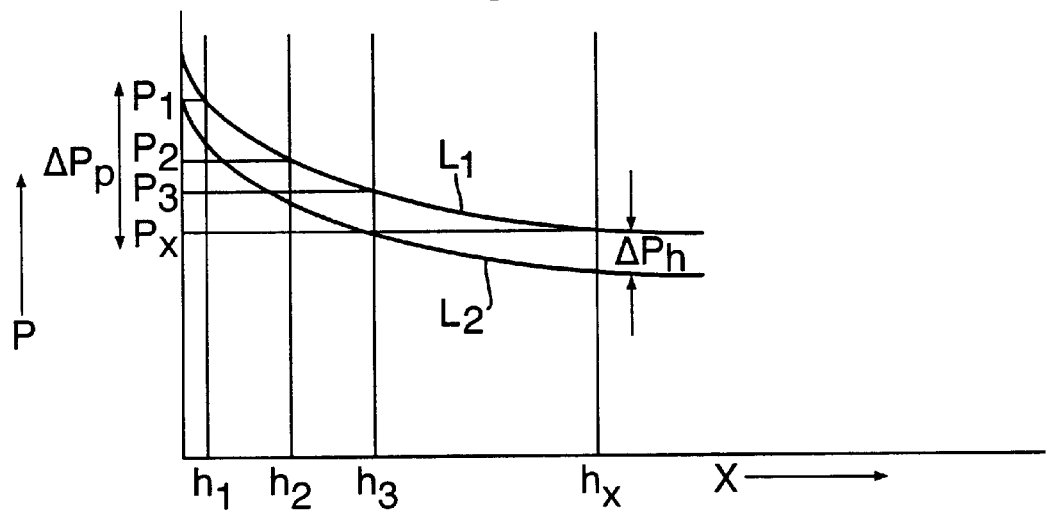
FIG. 6 is a graph illustrating the pressure characteristics of the construction shown in FIG. 5.

FIG. 6 illustrates the idealised pressure profile and in this case the pressure profile is the same as on the top surface of the perforated skin 20 but reduced by the pressure drop induced by the flow through the individual hole $\Delta P_h$.

This arrangement would always guarantee no outflow because the pressure at all the holes is less in the micro channel than that on the surface of the perforated skin 20. The pressure curve could, in fact, be lower than that shown in FIG. 6 in order to guarantee that this is the position but there is a limit to how far such a lowering could take place. This limit is that $\Delta P_h$ is not so large that the flow velocity through an individual hole exceeds the critical suction velocity as described previously.

The worst case in the other direction is to assume that the micro channel looks like a large plenum chamber with no pressure gradient. In that case $\Delta P_h$ would need to be equal to $P_1 - P_x$ as before.

The requirement for no outflow at any hole is that the sum of the pressure loss through the hole and the pressure due to flow in the micro channel must be greater than the difference in pressure of the surface for the two holes. This can be expressed as:

$$(\Delta P_{mc[x \to (x+1)]} + \Delta P_h > P_x - P_x - P_{x+1} \tag{11}$$

where $\Delta P_{mc[x \to (x+1)]}$ is the pressure loss in the micro channel between holes x and x+1, for the idealised case shown in FIG. 6 this $\Delta P_{mc[x \to (x+1)]} = P_x - P_{x+1}$. Therefore this inequality is always true and no outflow can occur. This means that $\Delta P_h$ can be much smaller than $\Delta P_p$ as it is summed with $\Delta P_{mc[x \to (x+1)]}$ and $P_x - P_{x+1}$ will be much smaller than $P_1 - P_x$. This means that the micro holes can be larger and, more importantly, the perforated skin can be much thinner. This is especially the case when it is realised the skin is everywhere supported between the rows of holes. This means that a much lighter, thinner skin and hence a lighter suction panel would be possible.

Figure 7:
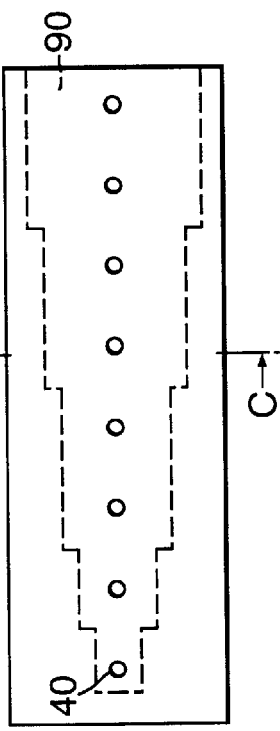
FIG. 7 is a plan view of a stepped-tapered micro-channel.
Figure 8:
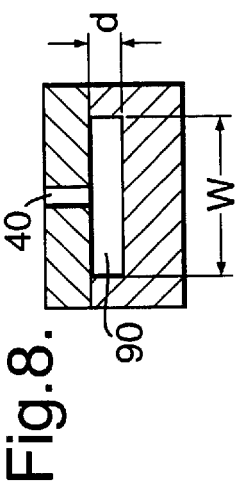
FIG. 8 is a section taken on the line C—C of FIG. 7.

FIGS. 7 and 8

To understand how a pressure profile as shown in FIG. 6 may be realised in practice, reference is now made FIGS. 7 and 8.

FIGS. 7 and 8 are plan and sectional views taken on line C—C of FIG. 7, respectively of an individual micro channel 90.

The pressure loss in the micro channel 90 will, to a first order, be directly proportional to the cross-sectional area of the channel which in turn depends on the dimensions W and d as shown in FIG. 8. The dimension W may be varied to give the varying pressure loss and required pressure gradient but this could also be achieved by varying d or indeed by varying both W and d.

The micro channels 90 are aligned with the micro channel suction holes 80 and the plenum chamber 30 at the low pressure end of the pressure gradient. Therefore, if the pressure gradient is reversed compared to those described, then the channels would extend to the right of the plenum chamber. At the point where the pressure gradient changes sign, the micro channels could then extend both left and right from the plenum chamber.

Figure 9:
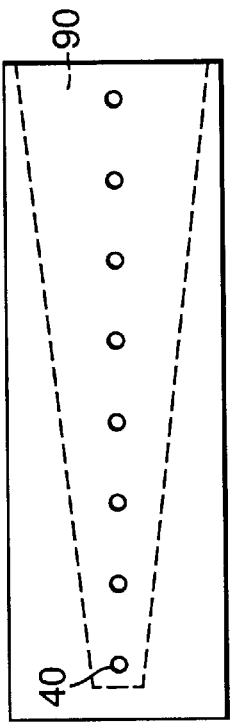
FIG. 9 is a plan view similar to FIG. 7 but showing a continuously tapered micro-channel.

FIG. 9 is a similar view to FIG. 7 but shows a variation in the plan shape of the micro channel 90.

Figure 10:
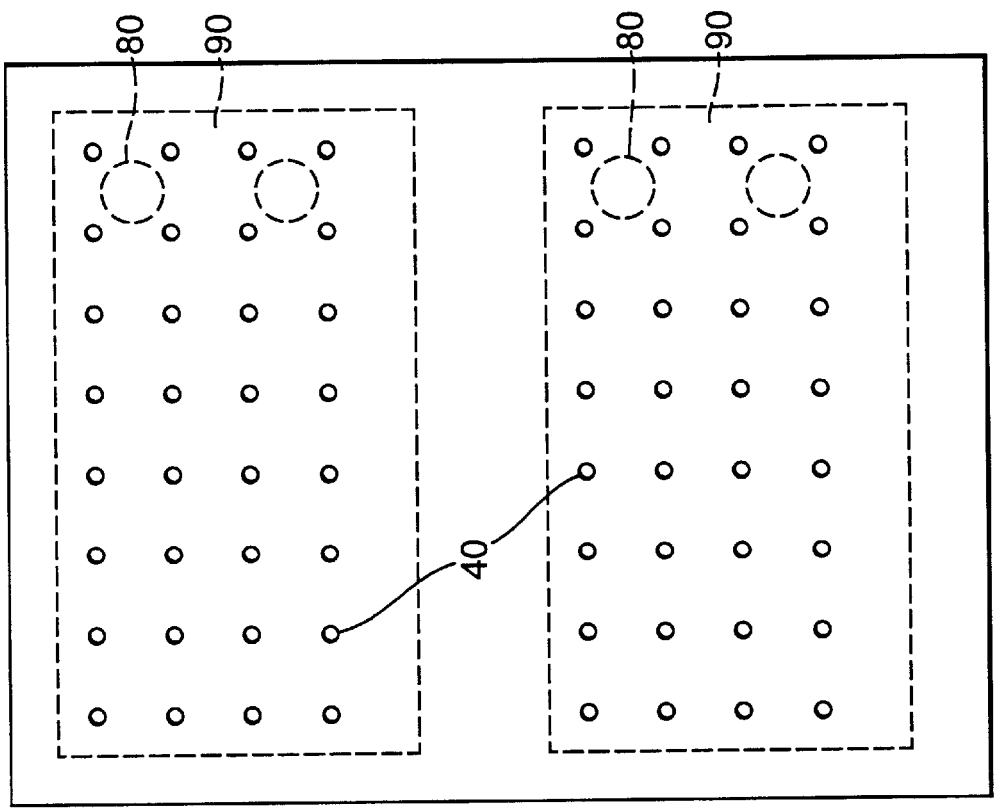
FIG. 10 is a plan view of a further micro-channel configuration in which each micro-channel contains more than one row of micro apertures.

FIG. 10 is also a view similar to FIG. 7 but showing an arrangement in which there is more than one (in this case four) row of holes 40 in each micro channel 90, in this example there being two suction holes 80 in each micro channel 90. With this arrangement there would be an enlarged bonding area between each of the two micro channels illustrated, these micro channels being enlarged in the non-flow direction.

A number of variations could be made to the specific embodiments previously described with reference to the accompanying drawings, these modifications including the following:

a) materials other than titanium and carbon fibre composite could be used to manufacture the suction panel;

b) techniques other than micro-machining could be employed for the forming of the micro channels;

c) the skin 20 could be stretched over the surface of the CFC base member 60;

d) the suction panel could be configured to have a single or multiple curvature;

e) the lower base member 60b could have a non-solid construction employing integral stiffness, thereby making it lighter;

f) the plenum chambers could be added separately;

g) the micro channels 90 could in fact be machined on the underside of the perforated skin 20, thus allowing easier fabrication;

h) the micro channels could be formed on the underside of the skin 20 by means of a laser beam which could also be used to form the holes through the skin 20, this being achieved by the laser beam being held stationary for a short period at the position of the desired holes and then scanned between adjacent hole position to form the micro channel, thus ensuring alignment of the micro channel with the rows of holes.

One advantage of the present invention is that any variations in the drilling of the micro holes 40 can be easily compensated for. This contrasts with the prior art method of manufacturing an LFC system where the plenum chambers are designed and then a performance specification is determined for the pressure loss characteristics of the perforated skin 2.

However, with this prior art method the drilling and forming process for the panel is not sufficiently well controlled or well-known to allow very precise control of the pressure loss characteristics. In addition, those characteristics vary across the panel and there is currently no way of compensating for this. With the present invention, the perforated panel can be manufactured and the pressure loss characteristics then measured. The micro channels in the upper CFC base member 60a can then be tailored to the pressure loss characteristics of the perforated skin 20.

What is claimed is:

1. A suction panel for use in a laminar flow control system, said panel comprising:

a skin, said skin having a plurality of perforations therethrough;

a base member supporting said skin, said base member including at least one plenum chamber supplied with a suitable source of suction; and at least one micro channel formed between said skin and said base member, said micro channel connecting said at least one plenum chamber to said plurality of perforations, said micro channel having a cross-sectional area which varies along said micro channel between said plenum and at least one of said plurality of perforations in which the perforated skin is mounted on a base member having a first base layer and a second base layer, the micro channels being formed in the first base layer and at least one plenum chamber being formed in the second base layer, with the micro channels being such that a controlled pressure gradient can be established therealong to ensure no outflow therefrom via the skin perforations.

2. A suction panel as claimed in claim 1 in which the perforated skin is bonded to the base member.

3. A suction panel as claimed in claim 1 in which at least one of the first base layer and second base layer comprises at least one layer of carbon fibre composite (CFC).

4. A laminar flow control system which comprises:

a skin, said skin having a plurality of perforations therethrough;

a base member supporting said skin, said base member including at least one plenum chamber supplied with a suitable source of suction;

at least one micro channel formed between said skin and said base member, said micro channel connecting said at least one plenum chamber to said plurality of perforations, said micro channel having a cross-sectional area which varies along said micro channel between said plenum and at least one of said plurality of perforations; and means for applying suction to the plenum chambers in order to maintain boundary layer suction on a free surface of the perforated skin.

5. A suction panel for use in a laminar flow control system, said panel comprising:

a skin, said skin having a plurality of perforations therethrough;

a base member supporting said skin, said base member including at least one plenum chamber supplied with a suitable source of suction; and at least one micro channel formed between said skin and said base member, said micro channel connecting said at least one plenum chamber to said plurality of perforations, said micro channel having a cross-sectional area which varies along said micro channel between said plenum and at least one of said plurality of perforations.

6. A suction panel as claimed in claim 5 in which the perforated skin is a metal.

7. A suction panel as claimed in claim 5 in which the perforated skin is made of a pliable material which enables said material to be stretched over a surface on which it is mounted.

8. A suction panel as claimed in claim 5, in combination with a laminar flow control system.

9. A method of manufacturing a suction panel as claimed in claim 5, including the step of employing a laser beam to form the micro channels and the perforations in the skin.

10. An aircraft flying surface incorporating a laminar flow control system as claimed in claim 5.

11. A suction panel in accordance with claim 5, wherein said cross-sectional area varies smoothly along said channel.

12. A suction panel in accordance with claim 5, wherein said source of suction comprises a means for applying suction to said plenum chamber said suction sufficient for maintaining boundary layer suction along said perforated skin.

13. An aircraft flying surface incorporating a laminar flow control system as claimed in claim 12.

14. A suction panel for use in a laminar flow control system, said panel comprising:

a skin, said skin having a plurality of perforations therethrough;

a base member supporting said skin, said base member including at least one plenum chamber supplied with a suitable source of suction; and at least one micro channel formed between said skin and said base member, said micro channel connecting said at least one plenum chamber to said plurality of perforations, said micro channel having a cross-sectional area which varies along said micro channel between said plenum and at least one of said plurality of perforations, wherein said cross-sectional area varies stepwise along said channel.

15. A suction panel for use in a laminar flow control system, said panel comprising:

a skin, said skin having a plurality of perforations therethrough;

a base member supporting said skin, said base member including at least one plenum chamber supplied with a suitable source of suction; and at least one micro channel formed between said skin and said base member, said micro channel connecting said at least one plenum chamber to said plurality of perforations, said micro channel having a cross-sectional area which varies along said micro channel between said plenum and at least one of said plurality of perforations, wherein said at least one micro channel comprises a plurality of parallel micro channels and said plenum chamber extends perpendicular to said micro channels.

* * * * *